Dec. 17, 1968   R. CAHEN ET AL   3,416,980
METHOD OF SEALING FRUSTO-CONICAL LEAD-THROUGH ELEMENTS
Filed Dec. 23, 1963   3 Sheets-Sheet 1

INVENTORS.
ROGER CAHEN
JEAN-PIERRE DRIFFORT
By Kurt Kelman
agent

Dec. 17, 1968   R. CAHEN ET AL   3,416,980
METHOD OF SEALING FRUSTO-CONICAL LEAD-THROUGH ELEMENTS
Filed Dec. 23, 1963   3 Sheets-Sheet 2

INVENTORS.
ROGER CAHEN
JEAN PIERRE DRIFFORT
By Kurt Kelman
Agent.

Dec. 17, 1968   R. CAHEN ET AL   3,416,980
METHOD OF SEALING FRUSTO-CONICAL LEAD-THROUGH ELEMENTS
Filed Dec. 23, 1963   3 Sheets-Sheet 3

INVENTORS.
ROGER CAHEN
JEAN-PIERRE DRIFFORT
By

United States Patent Office 3,416,980
Patented Dec. 17, 1968

3,416,980
METHOD OF SEALING FRUSTO-CONICAL LEAD-THROUGH ELEMENTS
Roger Cahen and Jean-Pierre Driffort, Levallois, France, assignors to Compagnie Francaise de Television, a corporation of France
Filed Dec. 23, 1963, Ser. No. 332,594
Claims priority, application France, Dec. 26, 1962, 919,660
3 Claims. (Cl. 156—89)

ABSTRACT OF THE DISCLOSURE

Sealing of a frusto-conical lead-through element into a frusto-conical aperture formed in a glass wall, in which surfaces of the element and aperture are coated with a fusible sealing substance and the element is partially inserted in the aperture. Then, in the presence of heat, a mechanical force is applied to effect movement of the element to its ultimate positions in the aperture, while the sealing substance coatings are fused together.

---

The present invention relates to the sealing of lead-through connections in glass, for example the sealing of leads extending through the envelope of vacuum tight enclosures of electron tubes.

It is an object of the invention to provide improved lead connections through glass.

It is another object of the invention to provide an improved method for making such sealings.

The invention applies more particularly, although not exclusively, to glass walls of substantial thickness, for example one or more centimeter thick.

In the field of general electricity and still more in that of electronics, metal leads sealed into glass envelopes are often used to connect electrodes or electrode supports within said envelope to outside electrical connections. Such connections must be gas-tight, especially in electronics where high vacuum is generally necessary.

Generally, a hole is first made through the glass wall by means of a blow pipe. Then a metal lead is inserted in the aperture, which lead is either bare or embedded in glass of the same nature. The glass-to-glass or glass-to-metal welding is accomplished with the blow pipe properly set.

This general method, of which many modifications exist, all of which belong to the same general technique, is as a rule suitable only with a glass of relatively small thickness, say less than five millimeters.

As a matter of fact, when glass thickness becomes important, welding to the glass becomes difficult, if not impossible. An extensive area would have to be heated intensely around the place where the lead-through is to be positioned, which might result in strains and a deformation of the envelope, which is hardly compatible with the mechanical resistance of glass or is harmful to the optically polished character of the adjacent glass areas.

There is also a method of sealing a lead into glass which consists in positioning this lead in an aperture formed in the glass wall and heating this lead by causing a current to flow therein, which results in a metal-to-glass welding.

Experience shows that this method, which is based on heating through the Joule effect, is ill suited for sealing leads into thick glass walls. The temperature of metal parts which are outside the wall is always much higher than that of the metal portion imbedded in glass, since the latter contributes to the cooling. Thus, when the wall is thick the outer portions of the lead-through arrangement are often burnt or oxidized to a substantial degree before the sealing is terminated.

It is also known to seal leads into glass by first making an aperture in the glass wall and sealing in that aperture a lead-through element, having the same contour as the aperture, by introducing between the lead and the wall of the aperture additional material in pasty state, such as glass or enamel, the melting temperature of this material being lower than the annealing point of the glass wall.

The melting of this additional material is obtained by heating the article concerned in an oven after the lead-through element has been mounted in the aperture formed in the wall and the additional material put in place.

The lead-through element is either of a regular cylindrical shape or, while being generally cylindrical, has a shoulder also cylindrical but with a diameter different from the remainder of the element.

When the wall through which the lead extends is that of a vacuum enclosure, the outside pressure can have a detrimental effect on the sealing. If the lead-through element is cylindrical and has no shoulder, the outside pressure tends to push the lead-through element into the enclosure, thus risking to break the envelope. If the lead-through element is provided with a shoulder, the outside pressure acts to reinforce the sealing action in the shoulder area, as long as it does not bring about a breakdown. However, the strains within the glass, resulting from the outside pressure, are concentrated within the limited shoulder area, which can also result in a breakdown of the wall.

According to the invention there is provided a lead-through, of the type positioned within an aperture which was first formed in a wall, the general contour of the aperture being the same as that of the sealed portion of the lead-through element and an additional substance surrounding the latter within the aperture, characterized in that the lead-through element portion, positioned within the aperture, and the aperture itself are in the shape of a truncated cone.

This has the consequence that the outside pressure, when the latter is greater at the large base side of the lead-through than at the other side thereof, tends to keep the lead-through element in its place, thus acting in the same direction as the seal; but, in this case, the strains due to this pressure are uniformly distributed over the whole of the lateral surface along which the lead-through and the aperture walls are in contact.

The invention also provides a method for performing such sealings.

According to the method of the invention, which is of the general type where the lead-through element is positioned within an aperture previously formed in the wall and is sealed to the wall by means of an additional glass or enamel substance, the melting temperature of which is lower than the annealing point of the wall, this temperature being reached in an oven, the ultimate positioning of the lead-through in the aperture formed in the wall, this lead-through being in the form of a truncated cone, and the sealing thereof both take place in the oven under the combined action of the heating and of a mechanical force which is exerted during the heating in a manner to apply against each other the walls of the lead-through element and the walls of the aperture.

The following additional advantages accrue from the above procedure:

(a) The sealing is extremely tight due to the fusion under pressure of the added substance.
(b) If the respective expansion coefficients of the glass, added substance and lead-through are not entirely matched, this mismatching is compensated by means of a slight adjustment in the degree of penetration of the lead-through into the wall, which adjustment takes place of itself in the course of the sealing under pressure.

The invention will be better understood from the following description and appended drawing, wherein.

The truncated cone shape which is used, according to the invention, has all the advantages of all bodies of revolution. Mechanical pressure can be easily applied to provide a satisfactory distribution of forces which press against each other the walls of the aperture and the lead-through element, while insuring an adequate positioning of the latter within the former, the degree of freedom of the lead-through with respect to the aperture being very limited.

Also, as is mostly the case in the field of electronics, when the wall considered belongs to an envelope inside which the pressure is substantially lower than outside, the truncated cone contributes to strongly fitting the lead-through element in the wall, if the larger base of the cone is at that side where the pressure is stronger.

It has been found that an angle at the apex of some 30° is quite satisfactory in this respect. This figure is of course in no way limitative.

Figure 1:
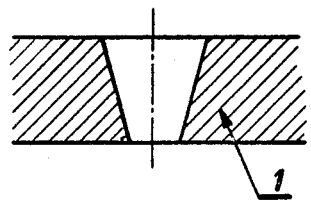
FIG. 1 shows the aperture in the shape of a truncated cone formed in a glass wall.

FIG. 1 shows in section an aperture of that shape formed in a glass envelope 1, for example by means of a triangular drill, the small base facing the side where the pressure is lower.

Figure 2:
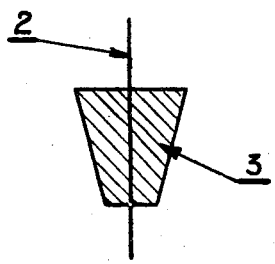
FIG. 2 shows a lead-through metal pin embedded in a glass body having the shape of a truncated cone.

FIG. 2 shows in axial section a lead-through arrangement comprising a metal pin 2 embedded in a glass body, shaped as a truncated cone 3. The metal of the pin should be matched with the glass of body 1 and the latter is preferably the same as that forming the envelope, unless otherwise required by the nature of the metal from which the pin is formed.

Figure 3:
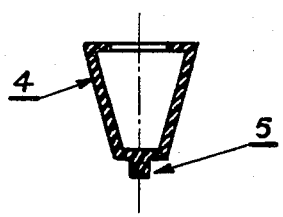
FIG. 3 shows a metal lead-through in the shape of a hollow truncated cone.

FIG. 3 shows a lead-through 4 of the same type, but hollow. The small base terminates in a small cylindrical body 5, which serves as a support for an electrode and/or as an electrical connection to an electrode within the envelope.

Although, in the case of attachment of an electrode to the wall, it is not necessary that the element fixed to the wall should extend through the latter, the strength of the lead-through according to the invention is such, in particular if the truncated cone piece is made of metal, that it may be advantageous to use it for that specific purpose.

A circular hole is made in the large base of the cone for the attachment of outer connections. As to the metal used the same remarks apply as in the case of pin 2 of FIG. 2.

Figure 4:
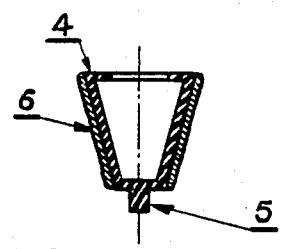
FIG. 4 shows the lead-through element of FIG. 3 covered with glass.
Figure 13:
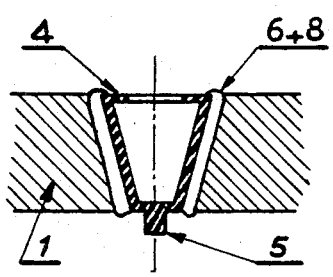
FIG. 13 shows a lead-through formed as a hollow truncated cone sealed in a wall.
Figure 5:
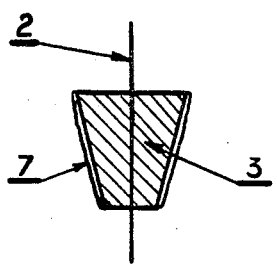
FIG. 5 shows the lead-through of FIG. 2 coated with enamel or glass.

FIG. 4 shows the element 4 of FIG. 3, coated with a glass 6. The remarks concerning the glass of element 3 of FIG. 2 are pertinent as concerns coating 6.

According to the invention, the sealing of the lead-through into an aperture formed in a wall can be made as follows, assuming first the lead-through to be of the type shown in FIG. 2:

(a) The lateral walls of the truncated cone are coated with additional glass or enamel in pasty state, the paste being obtained by mixing glass or enamel in powder with a suitable liquid, for example a collodion solved in an organic solvent, a coating 7 is thus obtained.

Figure 6:
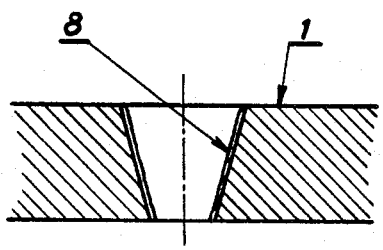
FIG. 6 shows the aperture of FIG. 1 with its walls coated with enamel or glass.

(b) As shown at 8 in FIG. 6, the walls of the aperture formed in the envelope are also coated in the same way.

Figure 7:
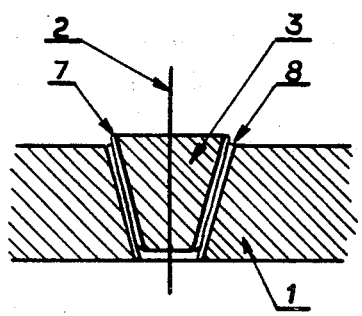
FIG. 7 shows the lead-through placed in the corresponding aperture.

(c) Once the coating is dried, the lead-through insert 3 is inserted into the aperture as shown in FIG. 7. The aperture is made slightly greater than insert 3, to allow for the glass or enamel coating. However, this difference is small enough not to allow the insert, taking into account the coating thickness, to penetrate entirely within the aperture, the position of the insert at that stage being that shown in the arrangement of FIG. 7.

Figure 8:
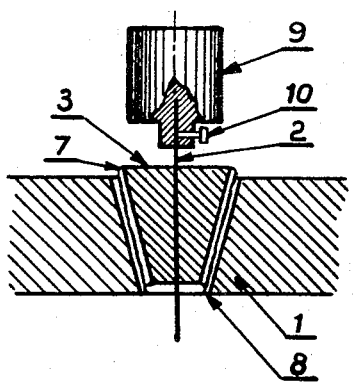
FIGS. 8 and 9 show two techniques of applying a pressure to the lead-through element of FIG. 6.
Figure 9:
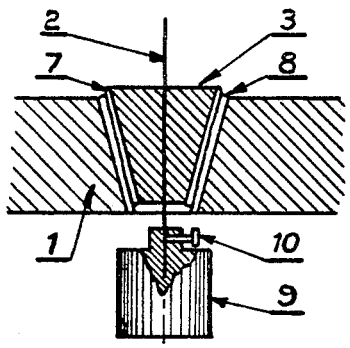

(d) As shown in FIG. 8, a weight 9 is affixed, by means of a screw 10, to pin 2, coaxially therewith, at the larger base of insert 3. If feasible, i.e. if an access to the inside of the envelope is possible, weight 9 can be advantageously at the smaller end of insert 3, so as to pull it down, as shown in FIG. 9.

Figure 10:
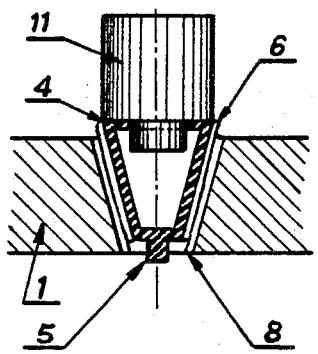
FIGS. 10 and 11 illustrate two techniques of applying a pressure to a lead-through element formed as a hollow truncated cone.
Figure 11:
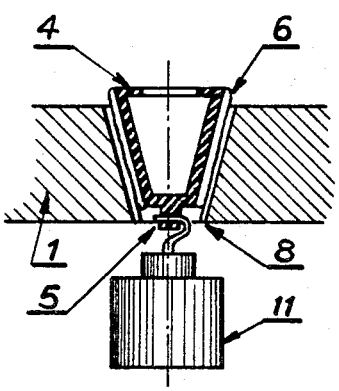

If the insert is a hollow truncated cone of metal (FIGS. 3 and 4) the procedure is the same as concerns the steps preceding the applying of the weight. As for the latter, it can be made to rest on the peripheral edge of the insert, as shown in FIG. 10. If feasible, weight 11 is advantageously hooked on the end 5, as shown in FIG. 11.

The pressure or the pulling exerted on insert 6 could be obtained otherwise than by means of a weight, for example by means of a spring, provided the behavior of the latter is not modified by heat. A spring might be useful in particular whenever the shape of the envelope or the position of the insert is such that the axis of the latter is not vertical. Nevertheless, even in this case, a weight can still be used by applying the weight by means of any suitable arrangement.

(e) Whether the arrangement of FIGS. 8, 9, 10 or 11, is used, the envelope is put into a furnace or oven which is brought to the melting temperature of the additional glass or enamel under pressure. This results in a correct positioning of the load under the conjugate of the melting of the additional substance and of the applied mechanical force. The final temperature is selected according to the characteristics of the additional glass or enamel.

Figure 12:
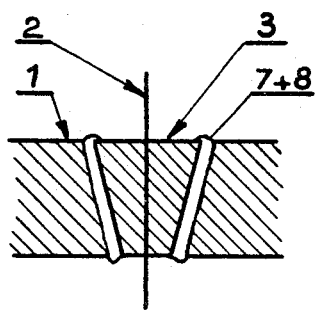
FIG. 12 shows a lead-through, where the lead element is a pin, sealed in a wall.

FIG. 12 shows the final aspect of a glass insert with a metal pin sealed in the envelope with a coating 7+8. FIG. 12, shows the final aspect of a hollow metal truncated cone with coating 6+8, sealed in the envelope.

Thus the following substances are sealed in succession to each other: metal-glass-enamel or glass coating-glass, or metal-glass or enamel coating-glass according to whether the metal portion of the lead-through has been embedded in glass or not.

Whether a sealing of the first or second type is selected depends on the physical and chemical characteristics of the components involved, which determine their relative compatibility, for example as regards their respective capability of coating each other or their respective expansion coefficients.

Of course, the invention is not limited to the particular arrangements described and shown which are given solely by way of example.

What is claimed is:

1. A method of sealing a frusto-conical lead-through element into a frusto-conical aperture in a glass wall, said method comprising the steps of coating the frusto-conical surfaces of said element and aperture with a sealing substance having a melting temperature lower than the annealing point of the glass, partially inserting the coated element into the coated aperture with the minor end of the element entering the major end of the aperture first, heating the glass wall with the partially inserted element to melt the coatings of the sealing substance, and simultaneously applying a mechanical force to effect inward axial movement of the element to its ultimate position in the aperture while the sealing substance coatings are fused together.

2. The method as defined in claim 1 wherein the step of applying the mechanical force comprises pulling said element into said aperture.

3. The method as defined in claim 1 wherein the step of applying the mechanical force comprises pushing said element into said aperture.

References Cited

UNITED STATES PATENTS

| | | | |
|---|---|---|---|
| 1,355,781 | 10/1920 | Rodgers | 29—464 |
| 2,106,578 | 1/1938 | Schwartzwalder et al. | |
| | | | 156—89 X |
| 2,377,317 | 6/1945 | Blume | 161—193 |
| 2,749,579 | 6/1956 | Shaw | 161—193 X |
| 2,931,142 | 4/1960 | Veres | 161—193 |
| 3,183,361 | 5/1965 | Bronson et al. | 159—89 X |
| 3,208,892 | 9/1965 | Miller et al. | 156—89 |

EARL M. BERGERT, *Primary Examiner.*

H. F. EPSTEIN, *Assistant Examiner.*

U.S. Cl. X.R.

65—59; 313—284, 289